Sept. 3, 1940.　　　　G. A. TINNERMAN　　　　2,213,924
JOINT OR CONNECTION
Filed April 2, 1938
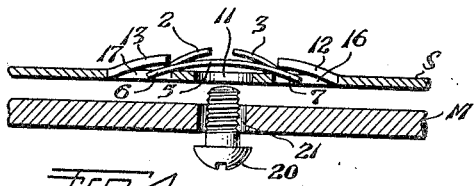
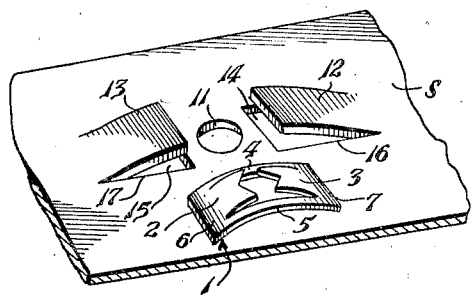
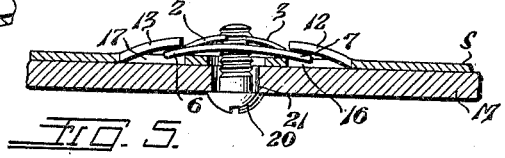
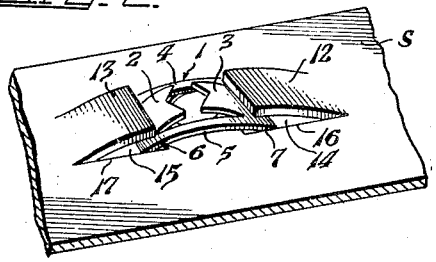
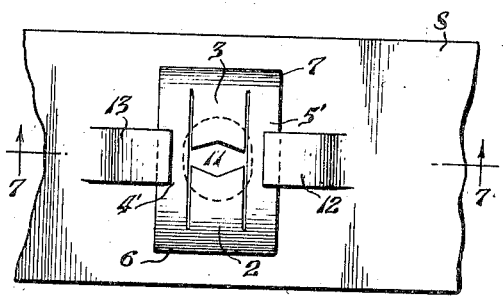
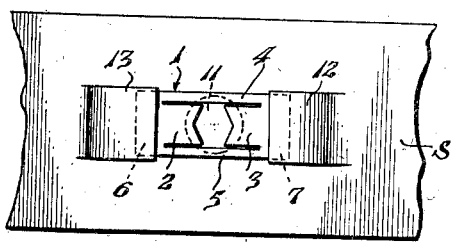
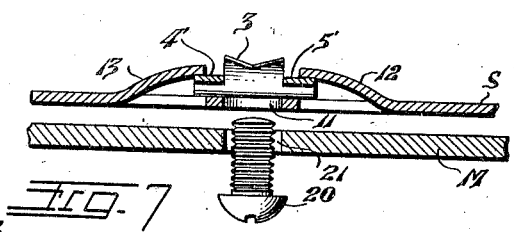
Inventor:
GEORGE A. TINNERMAN
By: H. G. Lombard,
Attorney Patented Sept. 3, 1940

2,213,924

UNITED STATES PATENT OFFICE 2,213,924

JOINT OR CONNECTION

George A. Tinnerman, Rocky River, Ohio, assignor, by mesne assignments, to Tinnerman Products, Inc., Cleveland, Ohio, a corporation of Ohio Application April 2, 1938, Serial No. 199,689

12 Claims. (Cl. 189—36)

This invention relates to an improved joint or connection embodied in a structural unit for a metallic structure in which the respective parts are not conveniently or readily accessible from both sides in the assembled relation thereof wherefore it becomes necessary to employ some extraneous means for retaining the securing means of the connection in applied position in an assembly preparatory to the operation for completing the fabrication of the structure. Constructions of this character requiring a joint or connection of the type exemplified by the instant invention have a wide range and variety of uses in the manufacture of articles comprising the panels and other precisely fitted parts of stoves, ranges, utility cabinets, metal furniture, refrigerator cabinets, casings and structural details of automobile body constructions and the like.

Examples of such constructions are disclosed in Patent 2,103,833, issued December 28, 1937, and copending prior application Serial Number 143,786, filed May 20, 1937, the present application being a continuation in part of said copending application which has since issued as Patent Number 2,157,641, May 9, 1939.

In the fabrication of sheet metal structures, it is well known that the attachment of ordinary sheet metal parts by means of screws threaded in openings provided therein is generally inefficient and unsatisfactory in that the walls of the openings thus provided are of insufficient thickness to form suitable threads with which a bolt or screw fastening may threadedly engage and be retained effectively in applied position. Also, it is usually impracticable to tighten a threaded member in such an opening since the bolt engaging elements thereof are easily stripped and mutilated by the axial drawing action incident to tightening, thereby causing the opening to become enlarged to the extent that the threaded member is loose in its final applied position and subject to unscrewing and displacement.

Accordingly, conventional threaded nuts have been found necessary for securing the various parts of sheet metal structures, such nuts being known in the trade, generally, as clinch-on nuts and are riveted, spot-welded, or otherwise secured to a sheet metal part by a suitable cage device preparatory to the assembly thereof in a structure in which it is readily accessible from one side only; that is, in a blind location wherein it is impossible or inconvenient for an operator to hold the nut while inserting the securing bolt or screw thereto. However, any such arrangement comprising only a threaded nut is often unsatisfactory and inefficient over a period of use, because, generally, no means are provided to prevent loosening and unscrewing of the threaded fastener. Furthermore, though any such fastening arrangement may be employed somewhat satisfactorily in certain installations in which cost is of no great consequence, the use thereof is prohibitive in such constructions as require a simple, light weight and inexpensive fastening means which may be easily and quickly applied in an installation in a minimum of time and effort in assembling operations.

In view of the foregoing, it will be understood that a most practical arrangement for securing such sheet metal parts involves the use of tempered, spring metal locking plates having integral bolt receiving means struck and formed therefrom designed for threadedly engaging a threaded fastening member in a manner of a nut. The spring metal material of such locking plates is, of course, considerably harder than that of the sheet metal supporting structure and accordingly, the bolt engaging elements thereof are admirably suited for providing not only a stronger, superior connection between the part secured and the supporting structure than would be possible otherwise, but also a tightened, practically self-locking, fastening engagement of the securing bolt in final applied position rigidly securing the respective parts of an installation. Thus, there is eliminated the necessity for lock washers and the like, with the resultant savings in the cost of such devices and the expense involved for labor in the tedious, time-consuming assembling operations which they require.

In the use of such spring locking plates, one of the most difficult problems which must be overcome is the provision of a suitable, satisfactory and inexpensive arrangement for retaining the locking plate on a sheet metal part preparatory to the application of a bolt fastening thereto in the fabrication of a structure. To this end, various types of such locking plates embodying retaining arms, ears, lugs and similar holding elements have been employed, but all these arrangements, of course, involve added costs of manufacture, which, in many instances are unwarranted when it is considered that, in the final analysis, all that is necessary is a small, inexpensive section of spring metal provided with the usual bolt engaging elements struck and formed therefrom for receiving a bolt fastening.

The present invention therefore has for a primary object the provision of a joint or connection in a sheet metal part comprising a simple, inexpensive, locking plate constructed from a single thickness section of spring metal and retained on the sheet metal part by integral elements struck therefrom and so formed as to provide for limited adjustment in the connection or joint.

Another principal object is to provide a connection or joint comprising retaining elements struck from the support to receive a locking plate in such a manner as to hold the same against rotation in applied position thus facilitating ready fastening engagement of the threaded member with the bolt receiving elements thereof.

A further object of the invention contemplates the provision of an improved joint or connection comprising a locking plate retained at the reverse side of the support in such a manner that a member may be secured to the exposed surface thereof in substantially flush engagement therewith.

Further objects and advantages of the invention will be apparent to those skilled in the art as a description thereof proceeds with reference to the accompanying drawing in which like reference characters designate like parts throughout the same, and in which:

Fig. 1 is a fragmentary perspective view of a sheet metal part provided with retaining elements struck and formed therefrom for receiving a locking plate shown about to be applied thereto;

Fig. 2 is a similar view showing the locking plate as applied to assembled relation with the retaining elements provided in the sheet metal part comprising the improved connecting means of the invention;

Fig. 3 is a fragmentary plan view of Fig. 2 showing the bolt engaging elements of the locking plate in substantial alignment with the bolt passage in the sheet metal part;

Fig. 4 is a fragmentary sectional view showing the improved connection embodied in a supporting part positioned in an installation preparatory to the application of the bolt fastening for securing a member thereto;

Fig. 5 is a similar view of the installation as completed showing the member secured as disposed in close, flush engagement with the supporting part;

Fig. 6 is a fragmentary plan view of a modified construction in which the locking plate is frictionally retained on the supporting part preparatory to the application of a threaded fastening for securing a member thereto; and, Fig. 7 is a sectional view along line 7—7 of Fig. 6, looking in the direction of the arrows, and including the member to be secured by the bolt fastening shown about to be applied.

It is often desirable in bolting parts together, particularly in inaccessible locations or other positions accessible only with difficulty, to provide some manner of holding the nut element in its desired position while the bolt is being applied thereto. Furthermore, it is often difficult, especially in the final assembly of parts, to bring the respective bolt passages provided therein into proper alignment for the insertion of the bolt fastening. It is therefore frequently necessary that some adjusting means be provided in one or both of the members secured in order that the respective bolt passages may be suitably aligned for receiving the bolt fastening. Otherwise it often becomes necessary to provide a new, accurately positioned hole to receive the bolt fastening and in the assembly of all metal structures, it is most inconvenient, laborious, time-consuming and often impractical, to compensate for an improperly positioned hole by drilling a new hole. To overcome this, it has been found expedient to make the bolt passages in the support of extra large size such that the bolt fastening is freely movable therein and may be adjusted as necessary to properly engage with the nut element provided on the supporting member. However, due to the fact that the nuts with which the bolts co-engage are often located in inaccessible locations and frequently require a certain amount of adjustment in order to correspond with the applied position of the bolts, it is necessary to retain the nuts on a support in what may be termed a floating mounting. And heretofore such mountings have been provided by the use of special nut holding means such as sheet metal cage devices which are spot-welded, riveted or otherwise secured onto the inner face of the support. In any event, the use of such cage or nut holding device is objectionable due to the added costs involved and also the expensive, time-consuming operations required in spot-welding or riveting the assembled nut and cage onto the supporting member.

The instant invention, in providing a joint or connection in which the locking plate is adjustably retained by integral means provided from the sheet metal part, is highly advantageous in that the use of conventional threaded nuts and separate nut holding or cage devices is entirely dispensed with; likewise, the expensive, time-consuming operation of spot-welding or riveting the nut holding devices onto the sheet metal part is eliminated with the resultant savings in costs of manufacture. And, at the same time, a connection is provided which not only is substantially equal in strength and appearance to any heretofore known similar assembly of parts, but also, in which the bolt fastening is rigidly secured by the bolt engaging elements of the locking plate under continuously effective spring holding action to provide a substantially locked connection in which the connected parts in a completed structure are not subject to loosening or displacement incident to strain and vibration over long periods of use.

Referring now, more particularly, to Figs. 1–5 inclusive of the drawing, the letter S, designates generally a sheet metal part which may be a fragment of any sheet metal structure to which it is desired to attach another part or member by means of a bolt or screw fastening employing the improved connecting means of the present invention. Generally, it is preferable that the supporting part be provided with means adapted for receiving the locking plate and retaining the same entirely to the reverse side thereof wherefore a member secured thereto may be brought into close, flush engagement therewith in a completed installation such as shown in Fig. 5. This, of course, is a highly advantageous arrangement which is particularly useful in installations comprising closely fitted, precisely assembled parts in providing a uniform, smooth, exterior appearance.

As best seen in Fig. 1, in order to adapt the sheet metal part S for use with a locking plate in providing the improved connection of the present invention, a bolt passage 11 is provided together with opposed, integral retaining elements 12, 13, on either side thereof presenting a substantial bight or socket therebetween into which a locking plate may be fitted and positively retained as hereinafter more fully set forth. Inasmuch as the retaining elements 12, 13, are simply lugs struck and formed from the supporting part to project out of the plane thereof, it will be appreciated that they may be provided with little added expense in the same punching operation by which the necessary bolt passage 11 would be provided in any event.

In striking and forming the retaining elements 12, 13 from the supporting part as aforesaid, substantial slots 14, 15 are presented providing longitudinal side walls 16, 17, respectively. Thus, it will be understood that the said slots form substantial socket elements into which the extremities of a locking plate designated generally 1, may be received in applied position as shown in Figs. 2 and 3, and securely held in such position by frictional engagement with the retaining elements 12, 13. In this relation, the body of the locking plate bears directly on the supporting part S, with the bolt engaging elements 2, 3 thereof substantially overlying the bolt passage 11, Fig. 3, and capable of limited sliding adjustment relative thereto as presently to be described.

The locking plate is preferably constructed from a small section of tempered spring metal which, of course, is considerably harder and possessed of much greater tensile and compressive strength than the material of the sheet metal part to which it is attached. Although the locking plate may assume any desired form or configuration for effective engagement with the retaining elements provided in the support, for the purposes of the present invention, it is best provided in the form of a small, inexpensive, substantially rectangular section of spring metal which may be most economically manufactured from ordinary strip stock without loss or waste of material whatsoever. As shown in Fig. 1, the locking plate thus provided from a substantially rectangular section of spring metal comprises end portions 6, 7 and bridge portions 4, 5 between which integral tongues 2, 3, or similar bolt engaging means are deformed, extruded, or struck and formed, to project out of the plane thereof for threadedly engaging a bolt or screw fastening substantially in the manner of a nut. The said end and bridge portions provide, what may be termed, the body of the locking plate, which body is so formed in the stamping operation as to present a generally concave base from which the tongues extend upwardly in substantial ogee formation with the extremities thereof so spaced as to lie on a helix corresponding substantially to the pitch of the threads on the bolt fastening for most effective, uniform threaded engagement therewith. Such integral bolt receiving means in the locking plate may, of course, be provided in any other suitable form or construction depending on the strength required and the use to which the locking plate is put, so long as the elements thereof threadedly engage with the bolts as they are driven home. However, it has been found that such bolt receiving means prepared in the form of cooperating tongues, as shown, are the most efficient and most practical in that they are possessed of unusual inherent strength and will not collapse or pull through on tightening of the bolt nor loosen from fastening engagement under constant strain, heavy usage and rough handling of an installation in which they are used. This is possible by reason of the fact that such tongues tend, more effectively, to move toward each other and dig into the grooves intermediate adjacent threads on tightening of the bolt or screw and thereby become embedded in the root diameter of such threaded member in locked, frictional fastening engagement therewith. Thus, any vibration, jarring or strain taking place in a completed mounting cannot cause displacement, reverse rotation or tend toward unscrewing of the threaded members from applied fastening position. It will therefore be appreciated that in the provision of such integral bolt receiving means in the locking plate embodied in the joint or connection of the instant invention, the use of individual threaded nuts or lock washers of any kind is entirely dispensed with thereby making for a considerable saving not only in the cost of such nuts and lock washers, but also materially reducing the expense and labor involved in the tedious, time-consuming assembling operations which such fastenings require.

As shown in Fig. 1, the locking plates when normally untensioned comprise preferably a generally concave base provided for in the stamping operation thereof. Accordingly, the assembly of the locking plate onto the supporting part in cooperative relation with the retaining elements 12, 13, is easily and quickly accomplished simply by flattening the concave base of the locking plate sufficient to permit sliding movement thereof to applied position substantially as shown in Figs. 2 and 3. In this relation, the locking plate is free to tend to assume its initial generally concave configuration such that the end portions 6, 7, thereof substantially snap into the slots 14, 15 and is otherwise frictionally engaged by the retaining elements 12, 13 to be held in applied position on the support preparatory to the application of a bolt fastening thereto as illustrated in Fig. 4.

Referring to Figs. 2, 3, and it will be seen that the locking plate in addition to being frictionally retained on the support by the retaining elements 12, 13, is also held against rotative movement relative to the support by reason of the abutting relation of the edge surfaces thereof with side walls 16, 17 of the slots 14, 15. This, of course, makes for a most important advantage especially in securing parts in blind locations where the locking plate is inaccessible and cannot be held by the operator while inserting and threadedly engaging the bolt fastening with the bolt engaging means thereof. At the same time, the locking plate is capable of limited sliding movement in its applied position on the support such that a certain amount of adjustment is possible to suitably align the bolt engaging means thereof with the bolt passage in the member secured. This is often found necessary to compensate for possible improper alignment of the bolt passages in the respective parts due to manufacturing variations and the like. To this end, it will be understood that the bolt passage 11 in the supporting part is made somewhat larger than necessary such that the securing bolt may suitably pass therethrough in accordance with the required adjustment of the locking plate on the support for aligning the bolt engaging means thereof with the bolt passage in the member secured, as aforesaid.

From the foregoing it will be understood that a supporting part S, provided with a connection comprising a locking plate retained thereon in applied position in the manner described, is admirably suited for use in blind locations or in any assembly in which the reverse side thereof is not readily accessible for conveniently holding the locking plate while inserting a bolt fastening thereto. Thus, as shown in Fig. 4, the bolt fastening 20, securing member M to the supporting part S through bolt passage 21, may be readily applied to threaded engagement with the bolt engaging means 2, 3, of the locking plate by the usual securing operation entirely from the accessible side without the necessity for holding the locking plate at the reverse side thereof during such operation. In this respect, it may be mentioned that inasmuch as the bolt engaging means preferably comprise yieldable tongues 2, 3, the securing bolt may be easily and quickly applied thereto by a simple, direct axial thrust in a substantial, ratchet-like action of the threads thereof with the extremities of the tongues until the same are engaged with the last effective thread on the bolt. At such point the securing bolt is given a quarter turn or more, as necessary, to fully tighten the installation and otherwise tension the locking plate such that the bolt engaging elements 2, 3 thereof are disposed in locked fastening engagement with the bolt under continuously effective spring holding action.

On tightening the securing bolt to complete the installation, the locking plate is necessarily flattened somewhat such that the end portions 6, 7 thereof are practically completely disposed in the recesses 14, 15 whereupon the member secured may be brought into close flush engagement with the adjacent face of the supporting part as shown in Fig. 5. During this tightening action of the bolt wherein the locking plate is flattened, it will be understood that the said end portions thereof are moved from their initial, normally untensioned position in the generally concave base outwardly and upwardly in a substantial lifting force which is transmitted to the tongues 2, 3, to urge the extremities thereof inwardly toward each other to dig into and become embedded in the root diameter of the bolt in locked fastening engagement therewith.

Thus, the connecting means of the instant invention provides an installation which is superior and more advantageous in many respects than any heretofore known clinch-on nut structure embodying a conventional threaded nut which of course requires not only a lock washer in providing a locked assembly, but also some extraneous means such as spot welding, riveting or cage devices to retain the nut in applied position on the support preparatory to the application of the bolt fastening thereto. It will therefore be appreciated that the use of the improved connecting means disclosed herein provides a considerable saving as compared to the costs involved in the use of threaded nuts, lock washers and cage devices, materially reduces the expense and labor incident to the tedious, time-consuming assembling operations which such fastenings require, and also eliminates entirely the costly riveting or spot welding operations necessary in prior constructions for providing similar joints and connections in metallic structures.

Figs. 6 and 7 show a modified construction for retaining the locking plate on the sheet metal part preparatory to the application of the bolt fastening for securing a member thereto. The retaining elements 12, 13 are struck and formed from the supporting part S together with an enlarged bolt passage 11 substantially in the manner set forth with respect to the embodiment of Figs. 1-5 inclusive. In this form however, the locking plate may be constructed of comparatively heavy material and of such width as to present relatively wide bridge portions 4', 5' in the generally concave base thereof. And since said bridge portions are bowed or arched intermediate the length thereof when normally untensioned, the locking plate may be easily and quickly applied to retained position on the support simply by flattening the same to position the bowed bridge portions thereof in tensioned, frictional engagement with the retaining elements of the supporting part substantially as shown in Fig. 7. When so positioned the bolt engaging means 2, 3 overly the bolt passage 11 and, of course, are capable of any desired adjustment necessary to align the same with the bolt passage 21 in the member M, to be secured thereto by the bolt fastening 20 substantially in the manner described with reference to the preferred form of the invention illustrated in Figs. 1-5 inclusive.

While throughout the description the locking plate is referred to as constructed preferably of spring metal, it is to be understood as fully contemplated within the scope of this invention, that such devices be provided from any other suitable material such as cold rolled metal having sufficient resiliency and other spring-like characteristics permitting its use in the instant combination in the manner and for the purposes aforesaid.

In providing the locking plates from tempered spring steel, there is, of course, a considerable advantage over cold rolled metal in that greater strength and durability in the joint or connection is provided and an effective self-locking action of the bolt or screw fastening with the bolt engaging means thereof is obtained. A further advantage resides in the fact that the bolt engaging means provided in a spring metal locking plate are necessarily possessed of such hardness as to withstand mutilation and distortion on tightening of a threaded fastening member in locking engagement therewith; thus, in an installation comprising a spring steel locking plate, when it is desirable or necessary to dismount the assembly for repairs or replacement of a damaged part, the bolt fastening may be removed without destroying the locking plate or otherwise injuring the bolt engaging means thereof such that it may be employed again in the same or a similar installation. This, of course, is not possible in the use of cold rolled metal which is relatively soft and ductile wherefore the bolt engaging means provided therein are distorted and mutilated in the initial application and tightening of a threaded fastening member therewith. Accordingly, it is to be appreciated that the use of locking plates provided from spring metal is most desirable and of vast importance in blind locations and other assemblies in which it is impossible or impractical to replace a locking plate without tearing down a considerable portion of a completed structure in order to gain access to the retaining means holding the same onto the reverse side of the supporting part.

In certain installations, however, costs are of paramount importance as respects the application and use of such locking plates whereupon it becomes necessary to construct the same of cheaper grade material such as cold rolled steel having spring-like properties. Such material, of course, does not have the strength and desirable qualities of tempered spring steel, but is sufficiently yieldable and resilient to permit the provision of locking plates having a subestantially equivalent application and use in the general combination disclosed herein. It is therefore to be understood that the invention, in no way, is limited by any reference in the description to the effect that the preferred form embodies a locking plate constructed of spring metal. It is also to be understood that the disclosure is not limited, in any manner or form, to the specific bolt engaging means shown and described, it being obvious that equivalent types of such fastening means, per se, may be embodied in numerous modifications within the spirit and scope of the invention without departing from the teachings or essential characteristics thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A joint or connection comprising, in combination, connected parts provided with bolt passages in substantial registration for receiving a threaded fastener, one of said parts comprising a sheet metal section provided with means for retaining a locking plate provided with threaded fastener securing means in applied position thereon preparatory to the application of a threaded fastener thereto for connecting said parts, said retaining means comprising a lug element struck from said sheet metal section to present a slot therein and project out of the plane thereof at a point removed from the bolt passage therein, said locking plate in retained position on said sheet metal section being engaged by said lug element and having a portion thereof received in said slot in the sheet metal section.

2. A joint or connection comprising, in combination, connected parts provided with bolt passages in substantial registration for receiving a threaded fastener, one of said parts comprising a sheet metal section provided with means for retaining a locking plate provided with threaded fastener securing means in applied position thereon preparatory to the application of a threaded fastener thereto for connecting said parts, said retaining means comprising cooperating lug elements struck from said sheet metal section to present slots therein and project out of the plane thereof at points removed from the bolt passage therein, said locking plate in retained position on said sheet metal section being engaged by said lug elements and having portions thereof received in said slots in the sheet metal section.

3. A joint or connection comprising, in combination, connected parts provided with bolt passages in substantial registration for receiving a threaded fastener, one of said parts comprising a sheet metal section provided with means for retaining a locking plate provided with threaded fastener securing means in applied position thereon preparatory to the application of a threaded fastener thereto for connecting said parts, said retaining means comprising a lug element struck from said sheet metal section to present a slot therein and project out of the plane thereof at a point removed from the bolt passage therein, said locking plate being generally concave in form and capable of being depressed into tensioned engagement with said projecting lug element with a portion thereof received in said slot in the sheet metal section in applied position thereon.

4. A joint or connection comprising, in combination, connected parts provided with bolt passages in registration for receiving a threaded fastener, one of said parts comprising a sheet metal section provided with means for retaining a locking plate provided with threaded fastener securing means in applied position thereon preparatory to the application of a threaded fastener thereto for connecting said parts, said retaining means comprising cooperating lug elements struck from said sheet metal section to present slots therein and project out of the plane thereof at points removed from the bolt passage therein, said locking plate being generally concave in form and capable of being depressed into tensioned engagement with said projecting lug elements with portions thereof received in said slots in the sheet metal section in applied position thereon.

5. A joint or connection comprising, in combination, a sheet metal part provided with a bolt passage and a lug element struck therefrom to project out of the plane thereof at a point removed from said bolt passage, a locking plate provided with thread engaging means retained in applied position on said sheet metal part by said lug element, and a member connected to said sheet metal part by a threaded fastening threadedly engaged with the thread engaging means of said locking plate, a slot presented in said sheet metal part by said lug element struck therefrom, said locking plate being engaged by said lug element and including a projecting section received in said slot to seat the locking plate in applied position on said sheet metal part preparatory to the application of the threaded fastening thereto for connecting said member and part in an installation.

6. A joint or connection comprising, in combination, a sheet metal part provided with a bolt passage and cooperating lug elements struck therefrom to project out of the plane thereof at points removed from said bolt passage, a locking plate provided with thread engaging means retained in applied position on said sheet metal part by said cooperating lug elements, and a member connected to said sheet metal part by a threaded fastening threadedly engaged with the thread engaging means of said locking plate, slots presented in said sheet metal part by said cooperating lug elements struck therefrom, said locking plate being engaged by said lug elements and including projecting sections received in said slots to seat the locking plate in applied position on said sheet metal part with the thread engaging means thereof overlying said bolt passage preparatory to the application of the threaded fastening thereto for connecting said member and part in an installation.

7. A joint or connection comprising, in combination, a sheet metal part provided with a bolt passage and a lug element struck and formed therefrom to project out of the plane thereof at a point removed from said bolt passage, a locking plate provided with bolt engaging means retained in applied position on said sheet metal part by said lug element, and a member connected to said sheet metal part by a bolt fastening having fastening engagement with the bolt engaging means of said locking plate, a slot presented in said sheet metal part by said lug element struck therefrom, said locking plate comprising a base engaged by said lug element and including a projecting section received in said slot and adapted for substantial abutting relation with a side wall thereof, whereby the locking plate is retained in nonrotative applied position on said sheet metal part preparatory to the application of the bolt fastening thereto for connecting said member and part in an installation.

8. A joint or connection comprising, in combination, a sheet metal part provided with a bolt passage and a lug element struck and formed therefrom to project out of the plane thereof at a point removed from said bolt passage, a locking plate provided with bolt engaging means retained in applied position on said sheet metal part by said lug element, and a member connected to said sheet metal part by a bolt fastening having fastening engagement with the bolt engaging means of said locking plate, a slot presented in said sheet metal part by said lug element struck therefrom, said locking plate comprising a base engaged by said lug element and including a projecting section received in said slot in substantial abutting relation with a side wall thereof, said projecting section having slidable engagement in said slot whereby the locking plate is retained in nonrotative applied position on said sheet metal part but is capable of limited sliding adjustment preparatory to the application of the bolt fastening thereto for connecting said member and part in an installation.

9. A joint or connection comprising, in combination, a sheet metal part provided with a bolt passage and cooperating lug elements struck and formed therefrom to project out of the plane thereof at points removed from said bolt passage, a locking plate provided with bolt engaging means retained in applied position on said sheet metal part by said cooperating lug elements, and a member connected to said sheet metal part by a bolt fastening having fastening engagement with the bolt engaging means of said locking plate, opposed slots presented in said sheet metal part by said cooperating lug elements struck therefrom, said locking plate comprising a base engaged by said lug elements and including projecting sections received in said opposed slots and adapted for substantial abutting relation with the side walls thereof, whereby the locking plate is retained in nonrotative applied position on said sheet metal part with the bolt engaging means thereof overlying said bolt passage preparatory to the application of the bolt fastening thereto for connecting said member and part in an installation.

10. A joint or connection comprising, in combination, a sheet metal part provided with a bolt passage and cooperating lug elements struck and formed therefrom to project out of the plane thereof at points removed from said bolt passage, a locking plate provided with bolt engaging means retained in applied position on said sheet metal part by said cooperating lug elements, and a member connected to said sheet metal part by a bolt fastening having fastening engagement with the bolt engaging means of said locking plate, opposed slots presented in said sheet metal part by said cooperating lug elements struck therefrom, said locking plate comprising a base engaged by said lug elements and including projecting sections received in said opposed slots and adapted for substantial abutting relation with the side walls thereof, said projecting sections being designed for slidable movement in said slots, whereby the locking plate is retained in nonrotative applied position on said sheet metal part but is capable of limited sliding adjustment preparatory to the application of the bolt fastening thereto for connecting said member and part in an installation.

11. A joint or connection comprising, in combination, a sheet metal part provided with a bolt passage and cooperating lug elements struck and formed therefrom to project out of the plane thereof at points removed from said bolt passage, a locking plate provided with bolt engaging means retained in applied position on said sheet metal part by said cooperating lug elements, and a member connected to said sheet metal part by a bolt fastening having fastening engagement with the bolt engaging means of said locking plate, opposed slots presented in said sheet metal part by said cooperating lug elements struck therefrom, said locking plate comprising a generally concave base which may be depressed on being engaged by said lug elements and including projecting end sections received in said opposed slots, said end sections being adapted for substantial abutting relation with the side walls of said slots and designed for slidable movement therein, whereby the locking plate is retained in nonrotative applied position on said sheet metal part with the bolt engaging means thereof overlying the bolt passage but is capable of limited sliding adjustment preparatory to the application of the bolt fastening thereto for connecting said member and part in an installation.

12. A joint or connection comprising, in combination, a sheet metal part provided with a bolt passage and cooperating lug elements struck and formed therefrom to project out of the plane thereof at points removed from said bolt passage, a locking plate provided with integral, yieldable bolt engaging means deformed therefrom retained in applied position on said sheet metal part by said cooperating lug elements, and a member connected to said sheet metal part by a bolt fastening having fastening engagement with said yieldable bolt engaging means of the locking plate, opposed slots presented in said sheet metal part by said cooperating lug elements struck therefrom, said locking plate comprising a flexible, generally concave base which may be depressed on being engaged by said lug elements and including projecting end sections received in said opposed slots, said projecting end sections being adapted for substantial abutting relation with the side walls of said slots and designed for slidable movement therein, whereby the locking plate is retained in nonrotative applied position on said sheet metal part with the bolt engaging means thereof overlying the bolt passage but is capable of limited sliding adjustment preparatory to the application of the bolt fastening thereto for connecting said member and part in an installation.

GEORGE A. TINNERMAN.